United States Patent [19]

Herzog

[11] Patent Number: 4,823,364

[45] Date of Patent: Apr. 18, 1989

[54] RECEIVE COUPLER FOR BINARY DATA COMMUNICATION SYSTEMS

[75] Inventor: Hans K. Herzog, Bellevue, Wash.

[73] Assignee: The Boeing Company, Seattle, Wash.

[21] Appl. No.: 25,168

[22] Filed: Mar. 12, 1987

[51] Int. Cl.[4] .................. H04L 25/03; H04B 3/02
[52] U.S. Cl. .................................. 375/36; 375/94; 375/87; 333/20
[58] Field of Search ............... 375/4, 36, 94, 95, 87; 178/70 R; 328/164; 329/104, 126; 370/85; 333/20

[56] References Cited

U.S. PATENT DOCUMENTS

| | | | |
|---|---|---|---|
| 2,904,683 | 9/1959 | Meyer | 329/104 |
| 3,369,181 | 2/1968 | Braymer . | |
| 3,476,879 | 11/1969 | Zenner | 178/70 R |
| 3,597,733 | 8/1971 | Foxwell . | |
| 3,624,528 | 11/1971 | Adlhock | 375/94 |
| 3,745,249 | 7/1973 | Weiss | 178/70 R |
| 3,798,608 | 3/1974 | Huebner . | |
| 3,936,602 | 2/1976 | Korver | 178/58 R |
| 3,956,717 | 5/1976 | Fisher et al. | 333/11 |
| 4,021,685 | 5/1977 | Goodall et al. | 375/36 |
| 4,178,569 | 12/1979 | Reutter et al. | 333/119 |
| 4,199,663 | 4/1980 | Herzog | 370/85 |
| 4,229,831 | 10/1980 | Lacher | 375/94 |
| 4,264,827 | 4/1981 | Herzog | 307/17 |
| 4,280,221 | 7/1981 | Chun et al. | 375/17 |
| 4,337,465 | 6/1982 | Spracklen et al. | 340/825.03 |
| 4,397,042 | 8/1983 | Tsujii et al. | 455/608 |
| 4,471,481 | 9/1984 | Shaw et al. | 370/85 |
| 4,555,681 | 11/1985 | Dominick et al. | 333/112 |
| 4,596,023 | 6/1986 | Driver et al. | 375/55 |
| 4,606,053 | 8/1986 | Schröder | 375/87 |
| 4,615,039 | 9/1986 | Li et al. | 375/36 |
| 4,622,535 | 11/1986 | Ise et al. | 340/310 R |
| 4,627,073 | 12/1986 | Shepperd et al. | 375/20 |
| 4,630,284 | 12/1986 | Cooperman | 375/36 |
| 4,631,733 | 12/1986 | Spiesman | 375/7 |

FOREIGN PATENT DOCUMENTS 079527 5/1983 European Pat. Off. .

OTHER PUBLICATIONS

Belke et al.; GE Transistor Manual; 1969; pp. 43–80.
Riddle et al.; Transistor Physics and Circuits; 6/59; pp. 64–65.

Primary Examiner—Robert L. Griffin
Assistant Examiner—Marianne Huseman
Attorney, Agent, or Firm—Christensen, O'Connor, Johnson & Kindness

[57] ABSTRACT

A receive coupler for a binary data communication system that transmits signals in rectangular waveform on a data bus (11) is provided. The receive coupler includes a transition and polarity detector (17) that differentiates received signals and produces an output pulse on one or the other of two output lines (21a and 21b) for each transition of the received signal, the output line being dependent upon the rise-fall direction of the transition. That is, rise transitions create pulses on one output line (21a) and fall transitions create pulses on the other output line (21b). The receive coupler also includes reconstruction logic (19) connected to the output lines of the transition and polarity detector (17) that reconstructs the receive signal based on the pulses. The pulses are created in the transition and polarity detector by two differentiator-comparator combinations. One differentiator-comparator combination differentiates transitions of the rectangular waveform data signals amplified by a receiver amplifier (15) and produces a pulse when rise transition exceeds a threshold level and the other differentiator-comparator combination differentiates transitions of the rectangular waveform data signals amplified by the receiver amplifier (15) and produces a pulse when fall transition exceeds a threshold level.

10 Claims, 5 Drawing Sheets

RECEIVE COUPLER FOR BINARY DATA COMMUNICATION SYSTEMS

TECHNICAL AREA

This invention relates to binary data communication and, more particularly, to the communication of binary data between a plurality of terminals connected together via a common data bus.

BACKGROUND OF THE INVENTION

While this invention was developed for use in communicating data between various avionic systems and subsystems that need to share data, and is described in such an environment, it is to be understood that the invention can be utilized to communicate binary data in other environments. It is also to be understood that while the invention was developed for use with a current mode data bus, and is described in connection with such a bus, the invention can be utilized in connection with other types of data buses to improve the operation thereof, in particular, voltage mode and optical data buses. Similarly, while the invention was developed for use in a data communication system wherein the binary data to be communicated is in Manchester biphase form, it is to be understood that the invention can be used with binary data coded in other rectangular forms, such as binary data coded in mark-space form.

In modern aircraft, it is desirable to integrate, as far as possible, the functions of previous wiring-independent avionic systems to permit an attendant reduction in the weight, space and power requirements of the avionic systems, and to permit a simplification in wiring between physically separated avionic systems or subsystems thereof. Such integration has been achieved by the use of a common data bus to which each avionic system, or a subsystem thereof, has access through an associated terminal, each of which is capable of transmitting and receiving data. The data transmitted on the data bus by one terminal associated with a particular system or subsystem can be received by the terminals associated with remaining systems or subsystems, thus eliminating the requirement for separate wiring interconnections between the systems or subsystems. In addition, data generated by a particular system or subsystem can be used by any other system or subsystem without the necessity of having to independently generate that data.

While various types of communication systems that have been developed for use on-board aircraft to communicate between avionic systems and subsystems, as described in U.S. Pat. Nos. 4,199,663 and 4,471,481, both entitled "Autonomous Terminal Data Communications System" and assigned to the assignee of the present application, the most desirable avionic data communication system is an autonomous terminal data communication system, in particular, an autonomous terminal data communication system that uses a current mode data bus. Items critical to the operation of a data communication system that utilizes a current mode data bus are the reliability of the bus cable and the efficiency and reliability associated with the way each terminal is coupled to the bus. Current mode data bus coupling efficiency and reliability is addressed in U.S. Pat. No. 4,264,827 entitled "Current Mode Data Or Power Bus," also assigned to the assignee of the present application. The essence of the invention described in this patent is a coupling transformer having a ferrite core designed such that the core can be disassembled and two wires of a bus formed by a pair of twisted wires placed around the legs of the core in such a way that the magnetic path of the reassembled core surrounds the conductors. The arrangement is such that the bus wires form one of the windings of a transformer. The other winding is permanently installed on the core and is connected to the data transmitter and/or receiver electronics of a data terminal. The end result is the establishment of current coupling without the need to cut the bus wires or to remove or perforate the insulation that surrounds the wires.

Another item critical to the successful operation of a data communication system is the ability of the receiver electronics to accurately reproduce data signals carried by the data bus. If the signals are not accurately reproduced, they may be erroneously interpreted by utilization devices connected to the output receiver electronics. In this regard, data signals are frequently transmitted in rectangular form. An example of a rectangular data signal is a Manchester biphase data signal. Ideally, each transition of a rectangular wave data signal between signal levels is instantaneous. Unfortunately, the ideal does not exist. Rather, transitions between signal levels are exponential, with the time constant of the exponential transition being dependent upon the impedance characteristics of the data bus carrying the signal and the coupler that couples the data transmitter to the data bus. More specifically, as shown in FIG. 1, the bus signal, which represents transmitter generated Manchester biphase signals reproduced across the output terminals of a receive coupler transformer of the type described above, are not sharp. Rather, the transitions exponentially change over a discrete period of time.

In the past, bus signals of the type illustrated in FIG. 1 have been detected by a pair of oppositely biased comparators. The bias level is shown by the dashed lines located above and below the zero signal line of the bus signal section of FIG. 1. The outputs of the receiver comparator are shown on the receiver comparator lines of FIG. 1. While the mark-space transitions of the outputs of the receiver comparators are sharp, the comparator outputs are not an accurate reproduction of the originally transmitted Manchester biphase signal. Rather than being complementary, a gap exists between transitions of the comparator outputs. That is, both comparator outputs are at a common low level for a short period of time between the high-low transition of one comparator and the low-high transition of the other comparator. The length of the gap is related to the exponential transition time of the bus signal. This gap is commonly eliminated by downstream reconstruction circuits that respond only to the leading edges of the comparator output signals. As a result, the high-low transition of one biphase signal does not occur until the low-high transition of the other biphase signal. The result of this reconstruction is shown in the last lines of FIG. 1, which also illustrates the disadvantage of this approach, namely that the duty cycle of the first cycle of the data signal, in this case the sync pattern of the Manchester biphase signal, is not fifty percent. Rather, the first half of the mark-space cycle, denoted M1, is greater than the second half, denoted N1. As a result, the receive coupler reconstructed Manchester biphase signal, RXI and RXN, does not accurately represent the transmitter generated Manchester biphase signal, TX0 and TXN. This difference can lead to an erroneous interpretation of the output of the receive coupler by the utilization device to which it is connected. The invention is directed to providing a receive coupler that overcomes this problem.

SUMMARY OF THE INVENTION

In accordance with this invention, a receive coupler for a binary data communication system that transmits signals in rectangular form on a data bus is provided. The receive coupler includes a transition and polarity detector that differentiates received signals and produces an output pulse on one or the other of two output lines for each transition of the received signal, the output line being dependent upon the rise-fall direction of the transition. That is, rise transitions create pulses on one output line and fall transitions create pulses on the other output line. The receive coupler also includes reconstruction logic connected to the output lines of the transition and polarity detector that reconstructs the received signal based on the pulses.

In accordance with further aspects of this invention, the data bus signals are in electromagnetic form and the receive coupler includes a transformer that couples the data bus to the transition and polarity detector.

In accordance with further aspects of this invention, the receive coupler includes a receiver amplifier connected between the receive coupler transformer and the transition and polarity detector that amplifies received rectangular form data signals prior to their rise-fall transitions creating pulses.

In accordance with further aspects of this invention, the transition and polarity detector includes two differentiator-comparator combinations, one differentiator-comparator combination for differentiating rise transitions of the rectangular data signals amplified by the receiver amplifier and producing a pulse for each rise transition above a predetermined level and the other differentiator-comparator combination for differentiating fall transitions of the rectangular data signals amplified by the receiver amplifier and producing a pulse for each fall transition above a predetermined level.

As will be readily appreciated from the foregoing description, the invention provides a receive coupler that is significantly more accurate than receive couplers that utilize a pair of oppositely biased comparators to reconstruct a rectangular wave data signal transmitted on a data bus. The receive coupler of the invention is more accurate because the transition related pulses occur precisely at the same point with respect to each transition. As a result, the reconstructed receive signals precisely replicate the originally transmitted signal. While the invention is ideally suited for use in connection with electromagnetic, e.g., current mode and voltage mode, data buses, it is also useful in connection with other types of data buses, such as optical data buses since the receivers of optical data buses also produce rectangular wave data signals having exponentially changing transitions, rather than instantaneously changing transitions.

BRIEF DESCRIPTION OF THE DRAWINGS

The foregoing and other features and advantages of the present invention will become more readily appreciated as the same becomes better understood by reference to the following detailed description when taken in conjunction with accompanying drawings wherein.

DESCRIPTION OF THE PREFERRED EMBODIMENT

Figure 2:
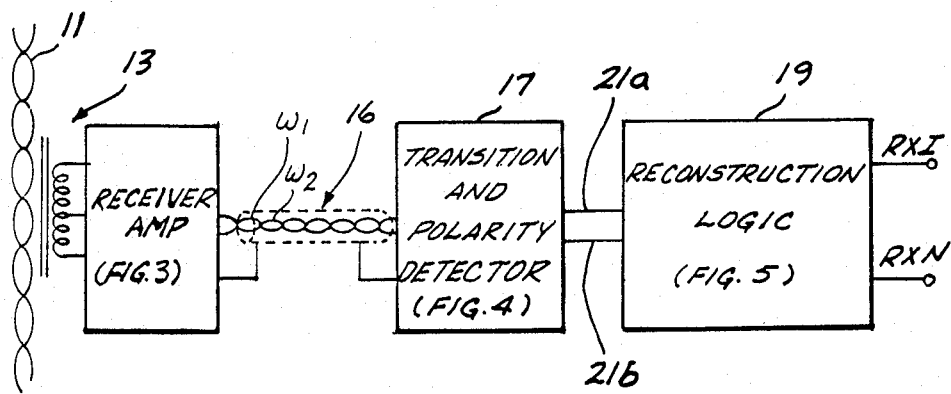
FIG. 2 is a block diagram of a receive coupler formed in accordance with the invention.

FIG. 2 illustrates a receive coupler formed in accordance with the invention coupled to a data bus 11. The receive coupler includes: a transformer 13; a receiver amplifier 15; a receive stub 16 formed of a shielded pair of twisted wires designated W1 and W2; a transition and polarity detector 17; and, reconstruction logic 19. The illustrated data bus 11 is a current mode data bus formed by a twisted pair of wires. The twisted pair of wires form the primary windings of the receive coupler transformer 13 which, preferably, is constructed in the manner described in U.S. Pat. No. 4,264,827, referenced above. In accordance with the invention, the secondary winding of the receive coupler transformer 13 is connected to the input of the receiver amplifier 15, which amplifies rectangular wave data signals (such as Manchester biphase data signals) carried by the data bus 11 and detected by the receive coupler transformer 13. The amplified signals are applied to the transition and polarity detector 17 via the receive stub 16, which may be relatively long—up to fifty (50) feet. The transition and polarity detector 17 differentiates the amplified signals it receives via the stub and produces pulses on a pair of output lines 21a and 21b. A pulse is produced for each transition of a rectangular wave data signal amplified by the receiver amplifier, which output line 21a or 21b carries the pulses determined by the rise-fall direction of the transition. That is, rise transitions create a pulse on one output line 21a and fall transitions create a pulse on the other output line 21b.

The two output lines 21a and 21b of the transition and polarity detector 17 are each connected to an input of the reconstruction logic 19. The reconstruction logic 19 reconstructs rectangular wave data signals detected by the receive-coupler transformer 13 in a manner that accurately replicates the originally transmitted rectangular wave data signals. The end result is rectangular form data signals having substantially instantaneous rise and fall transitions.

Figure 3:
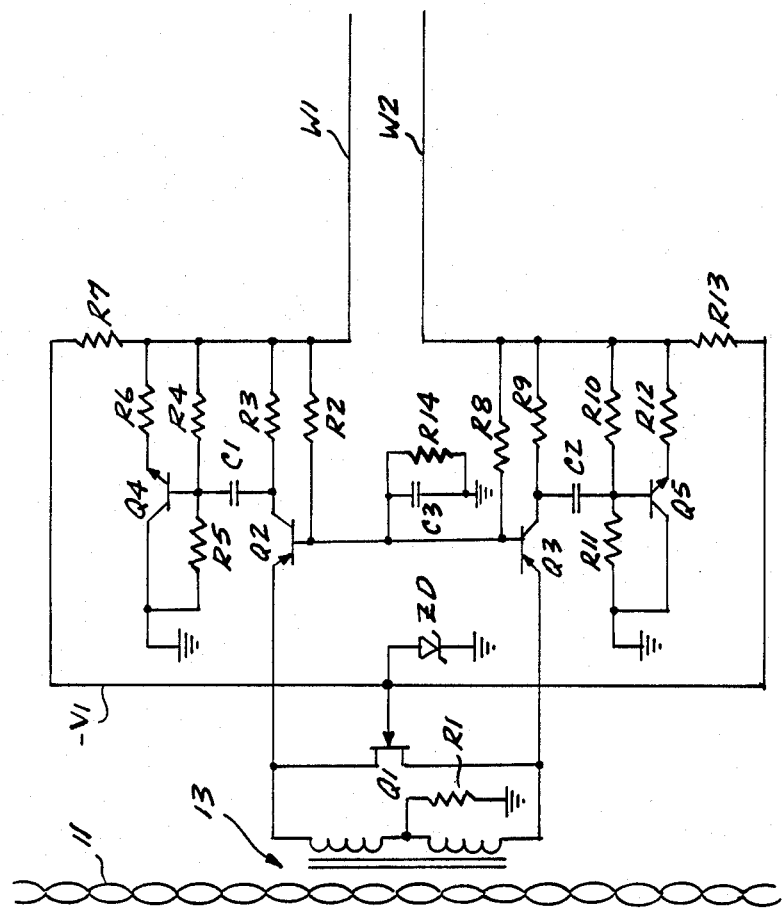
FIG. 3 is a schematic diagram of a receiver amplifier suitable for use in the receive coupler illustrated in FIG. 2.

FIG. 3 is a schematic diagram of a receiver amplifier suitable for use in the embodiment of the invention illustrated in FIG. 2. The receiver amplifier illustrated in FIG. 3 comprises: a depletion type JFET (junction field effect transistor) designated Q1; two PNP transistors designated Q2 and Q3; two NPN transistors designated Q4 and Q5; a zener diode designated ZD; three capacitors designated C1, C2 and C3; and, fourteen resistors designated R1 through R14.

One end of the secondary winding of the receive coupler transformer 13 is connected to the emitter of Q2 and to the source terminal of Q1. The other end of the secondary winding of the receive coupler transformer 13 is connected to the emitter of Q3 and to the drain terminal of Q1. The center of the secondary winding of the receive coupler transformer 13 is connected through R1 to ground. The gate terminal of Q1 is connected to a negative voltage bus designated −V1 and to the anode of ZD. The cathode of ZD is connected to ground. −V1 is supplied by the transition and polarity detector via W1 and W2 of the receive stub 16 in the manner hereinafter described.

The base of Q2 is connected through R2 in series with R7 to −V1. The collector of Q2 is connected through C1 to the base of Q4 and through R3 to the junction between R2 and R7. R4 and R5 are connected in series between ground and the junction between R7, R3 and R2. The junction between R4 and R5 is connected to the base of Q4. The emitter of Q4 is connected through R6 to the junction between R7, R4, R3 and R2. The collector of Q4 is connected to ground.

The base of Q3 is connected through R8 in series with R13 to −V1. The collector of Q3 is connected through C2 to the base of Q5 and through R9 to the junction between R8 and R13. R10 and R11 are connected in series between ground and the junction between R13, R8 and R9. The junction between R10 and R11 is connected to the base of Q5. The emitter of Q5 is connected through R12 to the junction between R8, R9, R10 and R13. The collector of Q5 is connected to ground. The bases of Q2 and Q3 are also connected through C3 in parallel with R14 to ground. One of the outputs, designated W1, occurs at the junction between R2, R3, R4, R6 and R7 and the other output, designated W2, occurs at the junction between R8, R9, R10, R12 and R13.

Q2 and Q3 and their biasing resistors form low input impedance amplifiers that amplify in a differential manner rectangular wave signals produced across the output of the secondary winding of the receive coupler transformer 13. The biasing network formed by R2 and R8 with R14 and C3 in combination with R1 control the quiescent current flow through Q2 and Q3 in essentially equal proportions. Differential signals of one polarity increase the current flow through Q2 while decreasing the current flow through Q3 and vice versa for differential signals of the opposite polarity. The signals produced at the collectors of Q2 and Q3 are connected by emitter follower drivers formed by Q4 and Q5 and their related biasing resistors to the outputs W1 and W2 of the receiver amplifier 15.

Preferably, the turns ratio between the data bus 11 and the secondary winding of the receive coupler transformer 13 is relatively high—1:20, for example. While a high turns ratio results in the current flow in the secondary winding being relatively small when a rectangular wave data signal is present on the data bus, a large turns ratio has the advantage of applying a relatively small load impedance to the data bus. The low load result is enhanced by the fact that Q2 and Q3, which form grounded base transistor amplifiers, have small input impedances.

The low input impedance grounded base transistor amplifiers, i.e., Q2 and Q3 and their associated biasing resistors, convert the relatively low signal currents drawn by Q2 and Q3 into relatively high signal voltages at the collectors of Q2 and Q3. The emitter follower stages, formed by Q4 and Q5 and their associated biasing resistors, couple the outputs of the grounded base transistor amplifier circuits to the wires W1 and W2 of the receiver stub 16, which connects the receiver amplifier 15 to the transition and polarity detector 17. The emitter follower stage transistors, Q4 and Q5 and their associated resistors, are chosen to create a receiver amplifier output impedance that matches the characteristic impedance of the receiver stub 16.

Figure 1:
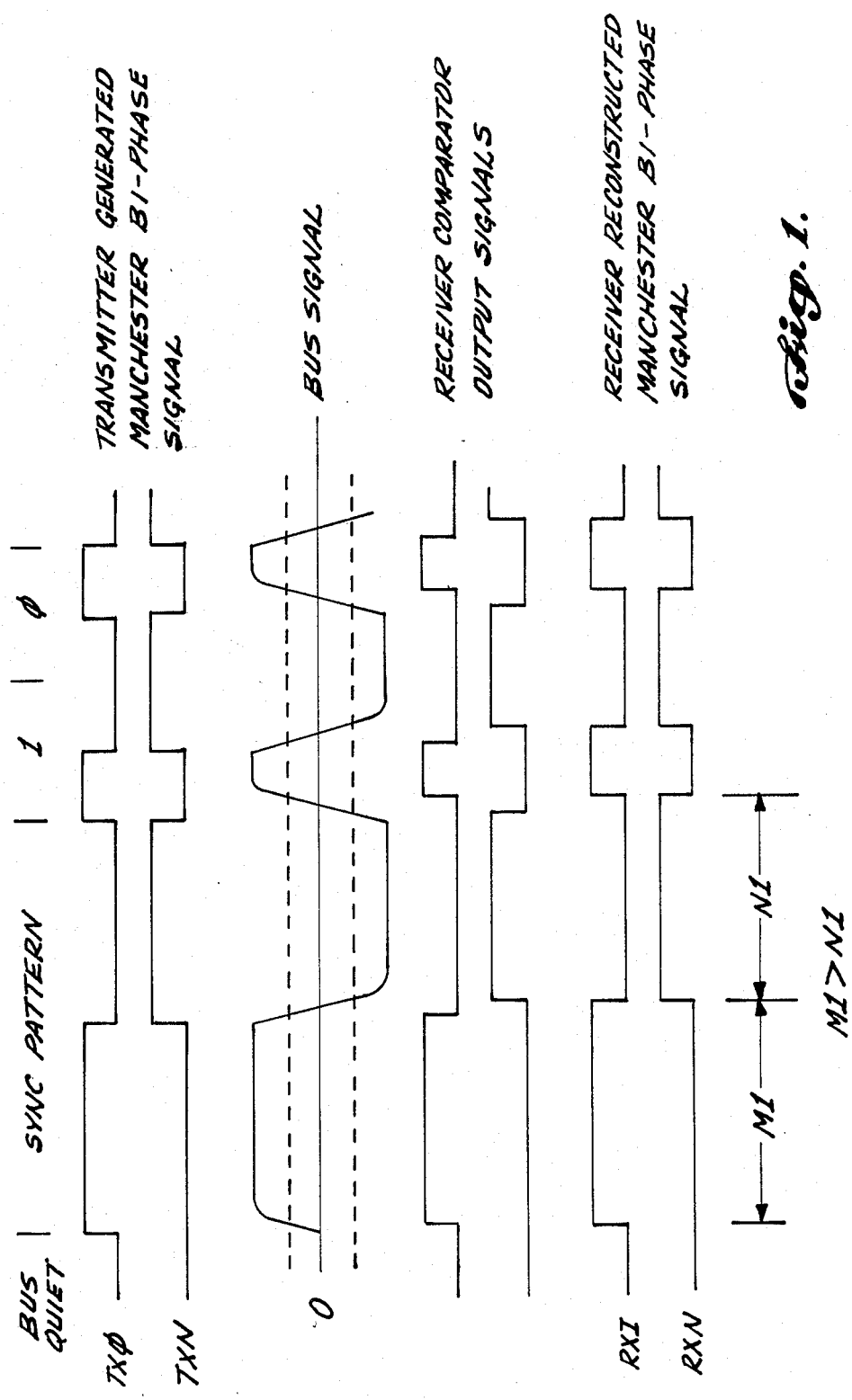
FIG. 1 is a series of waveforms illustrating the problems associated with prior art type mark-space receive couplers designed for use with data bus communication systems.
Figure 4:
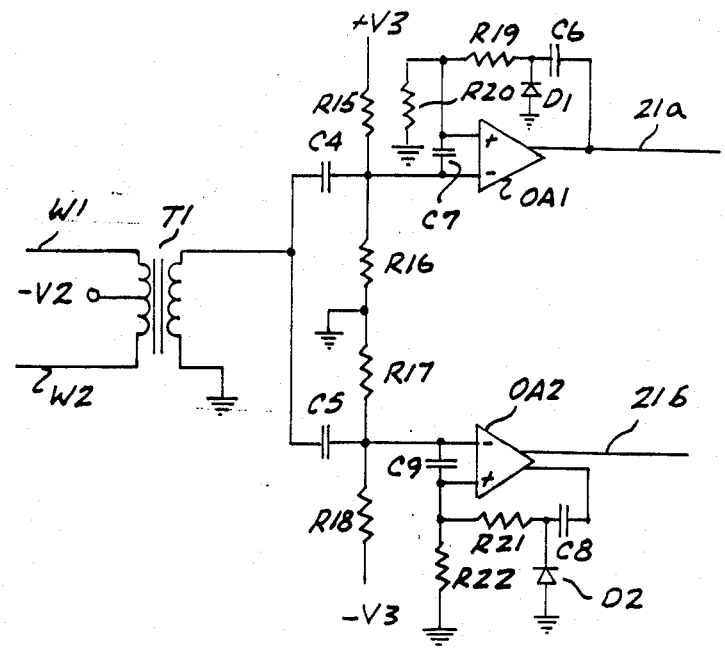
FIG. 4 is a schematic diagram of a transition and polarity detector suitable for use in the receive coupler illustrated in FIG. 2.

FIG. 4 is a schematic diagram of a transition and polarity detector formed in accordance with the invention and suitable for use in the receive coupler illustrated in FIG. 2. The transition and polarity detector illustrated in FIG. 4 comprises: a transformer designated T1; two operational amplifiers designated OA1 and OA2; six capacitors designated C4 through C9; two diodes designated D1 and D2; and, eight resistors designated R15 through R22. Stub wire W1 is connected to one end of the primary winding of T1 and stub wire W2 is connected to the other end of the primary winding of T1. The center of the primary winding of T1 is connected to the negative voltage source, designated −V2, which supplies power to the receiver amplifier via the stub 16.

One end of the secondary winding of T1 is connected to ground. The other end of the secondary winding of T1 is connected through C4 to the inverting input of OA1 and through C5 to the inverting input of OA2. R15, R16, R17 and R18 are connected in series in that order between a positive voltage source designated +V3 and a negative voltage source designated −V3. Even though their polarities are different, the magnitude of +V3 and −V3 are the same. The junction between R15 and R16 is connected to the inverting input of OA1 and the junction between R17 and R18 is connected to the inverting input of OA2. The junction between R16 and R17 is connected to ground.

C7 is connected between the inverting and noninverting inputs of OA1. The output of OA1 is connected through C6 in series with R19 and R20 to ground. The junction between R19 and R20 is also connected to the noninverting input of OA1. The junction between C6 and R19 is connected to the cathode of D1 and the anode of D1 is connected to ground. C9 is connected between the inverting and noninverting inputs of OA1. The complementary output of OA1 is connected through C8 in series with R21 and R22 to ground. The junction between R21 and R22 is connected to the inverting input of OA2. The junction between C8 and R21 is connected to the cathode of D2 and the anode of D2 is connected to ground.

Figure 6:
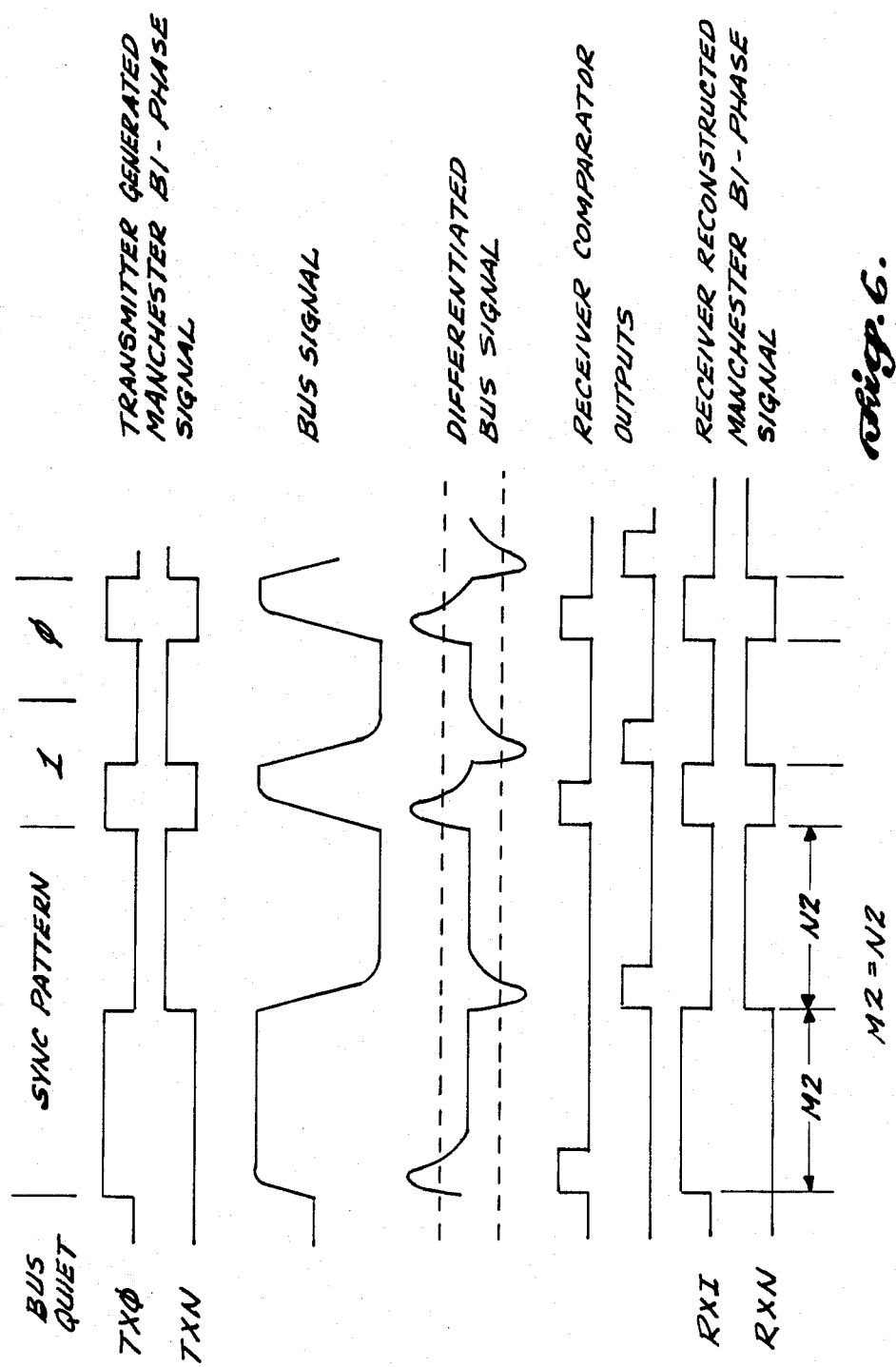

As will be readily appreciated from the foregoing description, the RC networks connected to the inputs of OA1 and OA2 form differentiators that produce spike-shaped pulses as shown in the differentiated bus signal line of FIG. 6. The biasing networks formed by R15 and R16 connected between +V3 and ground and by R17 and R18 connected between −V3 and ground provide threshold voltages as indicated by the dashed lines in the differential bus signal line of FIG. 6. More specifically, the threshold voltage of OA1 is shown by the lower dashed line and the threshold voltage of OA2 is shown by the upper dashed line. OA1 is thus made insensitive to pulses caused by rising transitions of the rectangular wave signals and OA2 is made insensitive to pulses caused by falling transitions. Hence, OA1 is only sensitive to above threshold pulses caused by falling transitions and OA2 is only sensitive to above threshold pulses caused by rising transitions.

The RC networks connected to the outputs of OA1 and OA2 result in the creation of monostable multivibrators that stretch pulses produced at the inputs of OA1 and OA2 as a result of the differentiation. The output of OA1 is applied to wire 21a and the output of OA2 is applied to wire 21b. As previously discussed with respect to FIG. 2, wires 21a and 21b connect the transition and polarity detector 17 illustrated in FIG. 4 to the reconstruction logic.

Figure 5:
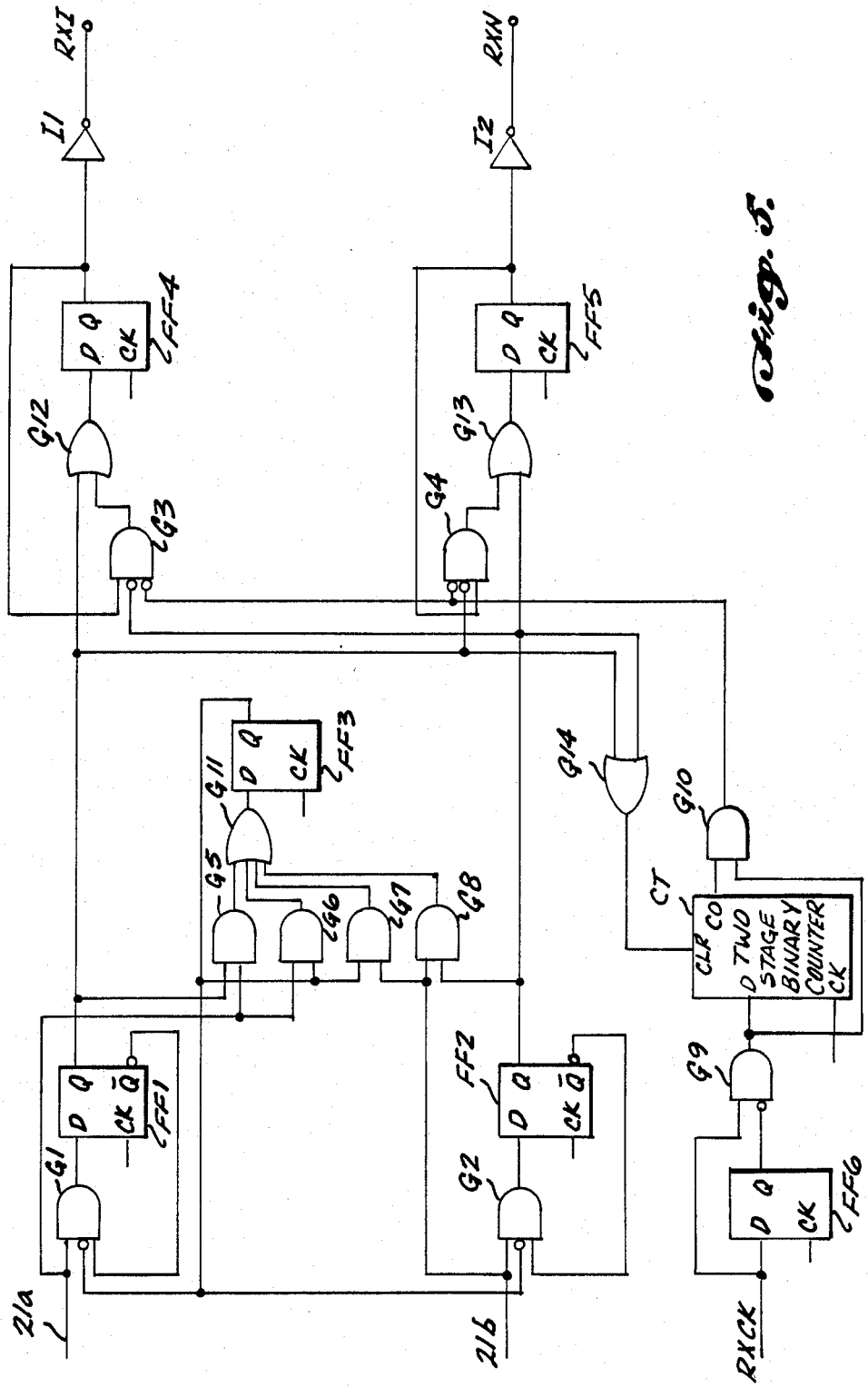
FIG. 5 is a block diagram of reconstruction logic suitable for use in the receive coupler illustrated in FIG. 2; and, FIG. 6 is a series of diagrams showing the signals at various points in the receive coupler illustrated in FIGS. 2-5.

FIG. 5 is a block diagram of reconstruction logic suitable for use in the receive coupler illustrated in FIG. 2. The reconstruction logic illustrated in FIG. 5 comprises: four three-input AND gates designated G1, G2, G3 and G4; six two-input AND gates designated G5 through G10; one four-input OR gate designated G11; three two-input OR gates designated G12, G13 and G14; six D flip-flops designated FF1–FF6; two inverters designated I1 and I2; and, a two stage binary counter designated CT. The logic diagram illustrated in FIG. 5 utilizes convention negation symbology. In this regard, G1, G2 and G9 each have one negation input and G3 and G4 each have two negation inputs.

The output 21a of OA1 of the transition and polarity detector illustrated in FIG. 4 is connected to one input of G1 and to one input each of G5 and G6. The output 21b of OA2 is connected to one input of G2 and to one input each of G7 and G8. The output of G1 is applied to the D input of FF1 and the $\bar{Q}$ output of FF1 is applied to a second input of G1. The Q output of FF1 is applied to the second input of G5, one input of G12, a negation input of G4 and one input of G14. The output of G2 is applied to the D input of FF2 and the $\bar{Q}$ output of FF2 is applied to a second input of G2. The Q output of FF2 is applied to one input of G8, a negation input of G3, one input of G13 and the second input of G14.

The outputs of G5, G6, G7 and G8 are each applied to one input of G11. The output of G11 is applied to the D input of FF3. The Q output of FF3 is applied to the negation input of G1, the negation input of G2 and the second inputs of G6 and G7.

The output of G3 is applied to the second input of G12 and the output of G12 is applied to the D input of FF4. The Q output of FF4 is applied to the input of I1 and to the non-negation input of G3. The output of G4 is applied to the second input of G13 and the output of G13 is applied to the D input of FF5. The Q output of FF5 is applied to the input of I2 and to the non-negation input of G4. One receive coupler output signal, RXI, is formed at the output of I1 and the other receive coupler output signal, RXN, is formed at the output of I2.

A bus quiet clock signal, denoted RXCK, is applied to the D input of FF6 and to one input of G9. The phase of RXCK is related to the phase of the clock signal to the clock, CK, inputs of FF1–FF6 and CT. In one actual embodiment of the invention, the frequency of RXCK was twice the bit frequency of the received data stream and had an essentially constant phase relationship with the bit boundaries of the data stream.

The Q output of FF6 is applied to the negation input of G9. The output of G9 is applied to the data (D) input of CT. The carry (CO) output of CT is connected to one input of G10. The output of G9 is applied to the second input of G10. The output of G10 is applied to the second negation inputs of G3 and G4. The output of G14 is applied to the clear (CLR) input of CT.

In operation, the stretched pulses produced on the outputs of OA1 and OA2 are clocked into FF1 and FF2 and cause the Q outputs of FF1 and FF2 to shift high provided the Q output of FF3 is low. The output of FF3 is low when all of the outputs of G5, G6, G7 and G8 are low. The outputs of G5 and G6 are low when the output of OA1 is low. The outputs of G7 and G8 are low when the output of OA2 is low. The output of G5 is also low when the Q output of FF1 is low; the outputs of G6 and G7 are also low when the Q output of FF1 is low; and, the output of G8 is also low when the Q output of FF2 is low. In essence, the logic network formed by G5 through G8, G11 and FF3 prevent more than one pulse from being produced by FF1 or FF2 for each pulse produced by OA1 or OA2, respectively. This result is achieved by the Q output of FF3 shifting high for one clock pulse after the output of FF1 or FF2 shifts high as a result of OA1 or OA2 producing a pulse.

The pulses produced at the Q output of FF1 and FF2 control the creation of Manchester biphase signals by FF4 and FF5. More specifically, when a pulse occurring on the output of FF1 is clocked into FF4 (through G12), the Q output of FF4 shifts high. As a result, the output of G3 shifts high. The high output of G3 holds the Q output of FF4 high. During this period, the Q output of FF5 remains low because the output of FF2 is low and because the pulse on the Q output of FF1 forced the output of G4 low.

When a pulse produced on the output of OA2 is clocked into FF2, the pulse on the Q output of FF2 forces the output of G3 low, resulting in the Q output of FF4 shifting low. At the same time the pulse on the Q output of FF2 is clocked into FF5 (through G13). As a result, the Q output of FF5 shifts high, resulting in the output of G4 shifting high. The high output of G4 maintains the Q output of FF5 high, until another pulse occurs on the Q output of FF1. As a result of this manner of operation, the Q output of FF4 and FF5 are always complementary, i.e., in opposite states.

FF6, CT, G9 and G10 form a bus quiet forcing circuit. More specifically, in an autonomous data terminal communication system, it is necessary to determine if the bus is quiet before a signal is transmitted by transmit couplers. This is accomplished by evaluating the output of the receive couplers. The reconstruction logic of the receive coupler of the present invention is forced to produce a bus quiet state a predetermined period of time after the end of a detected message. This is accomplished by RXCK in combination with FF6, G9, CT and G10. More specifically, as long as a message is being received, the pulses produced on the Q outputs of FF1 and FF2, via G14, continuously clear CT. As a result, an insufficient number of RXCK pulses are counted to cause the MSB output of G10 to shift states. Since pulses on the Q outputs of FF1 and FF2 end at the end of a message, CT is allowed to count RXCK pulses (differentiated by FF6 and G9) after a message ends. After a predetermined number of RXCK pulses (three in the illustrated embodiment of the invention) have been counted, the carry (CO) output of CT shifts to a high state. The next RXCK pulses cause the output of G10 to shift to a high state. The high output of G10 forces the outputs of FF4 and FF5 to achieve the same state, which is the bus quiet state. In essence, FF6 in combination with G9 reclocks RXCK. CT in combination with G10 forms a four pulse counter. More specifically, the carry (CO) output of the two stage binary counter shifts states after three pulses have been counted. As noted above, when the next (fourth) RXCK pulse occurs, the output of G10 switches states and forces FF4 and FF5 into the bus quiet state.

As will be readily appreciated from the foregoing description, the invention provides a receive coupler that accurately regenerates rectangular waveform signals transmitted on a data bus. As shown in FIG. 6, the pseudorectangular signals carried by the data bus are differentiated by the differentiator networks located at the inputs of OA1 and OA2. The comparators, i.e., OA1 and OA2, in combination with their RC output networks square and stretch the differentiated signals, which are then utilized by the reconstruction logic to replicate the original rectangular waveform signals. Because replication is accurate, the duty cycle of the first full wave, i.e., the sync pattern of the Manchester biphase signal illustrated in FIG. 6, is fifty percent. Consequently, detection errors resulting from a non-fifty percent duty cycle wave are eliminated.

While a preferred embodiment of the invention has been illustrated and described, it will be appreciated that various changes can be made therein without departing from the spirit and scope of the invention. For example, while the invention has been described for use in connection with a current mode data bus, it is equally useful in combination with voltage mode data buses, particularly a voltage mode data bus in which receive couplers are transformer coupled to the data bus. The invention is also useable in connection with other types of data buses, such as optical data buses. In essence, the invention is useable in combination with any type of data bus that carries rectangular waveform signals having noninstantaneous transitions. Consequently, the invention can be practiced otherwise than as specifically described herein.

The embodiments of the invention in which an exclusive property or privilege is claimed are described as follows:

1. A receive coupler for a binary data communication system that carries data in rectangular waveform over a current mode data bus, said receive coupler comprising:
   (a) coupling means for detecting rectangular waveform data signals carried by a current mode data bus and applying said signal to a transition and polarity detector, said coupling means including:
      (1) a coupling transformer for coupling rectangular waveform data signals carried by said current mode data bus to a low input impedance receiver amplifier, said coupling transformer constructed such that the wires that form said current mode data bus also form the primary winding of said coupling transformer, said coupling transformer having a high secondary to primary turns ratio; and,
      (2) a low input impedance receiver amplifier having its input connected to the secondary winding of said coupling transformer for amplifying said rectangular waveform data signals;
   (b) a transition and polarity detector connected to said low input impedance receiver amplifier of said coupling means for receiving said rectangular waveform data signals and producing a pulse for each transition of said rectangular waveform data signals; and,
   (c) logic means connected to said transition and polarity detector for receiving the pulses produced by said transition and polarity detector for each transition of said rectangular waveform signals and replicating said rectangular waveform signals based on said pulses.

2. A receive coupler as claimed in claim 1, wherein:
said transition and polarity detector has two outputs; and,
said transition and polarity detector produces a pulse on one of said two outputs for each rise transition of said rectangular waveform data signals and produces a pulse on the other of said outputs for each fall transition of said rectangular waveform data signals.

3. A receive coupler as claimed in claim 2, wherein said logic means includes:
first and second bistable devices; and,
control logic connected to said transition and polarity detector and to said first and second bistable devices for controlling the state of the outputs of said bistable devices such that the outputs of said bistable devices are in opposite complementary states.

4. A receive coupler as claimed in claim 3, wherein said control logic causes the output of said first and second bistable devices to switch states each time a pulse is produced by said transition and polarity detector.

5. A receive coupler as claimed in claim 4, wherein said transition and polarity detector includes:
a first differentiator-comparator combination for differentiating transitions of said rectangular waveform data signals received by said transition and polarity detector from said coupling means and producing a pulse each time said first differentiator-comparator combination differentiates a rise transition that exceeds a predetermined threshold level; and,
a second differentiator-comparator combination for differentiating transitions of said rectangular waveform data signals received by said transition and polarity detector from said coupling means and producing a pulse each time said second differentiator-comparator combination differentiates a fall transition that exceeds a predetermined threshold level.

6. A receive coupler as claimed in claim 1, wherein:
the secondary winding of said coupling transformer includes a center tap and said center tap is connected to ground; and
said low impedance receiver amplifier includes two grounded base transistor amplifiers, the emitter of the transistor of one of said grounded base transistor amplifiers is coupled to one end of the secondary winding of said coupling transformer and the emitter of the transistor of the other of said grounded base transistor amplifiers is coupled to the other end of the secondary winding of said coupling transformer.

7. A receive coupler as claimed in claim 6, wherein:
said transition and polarity detector has two outputs; and,
said transition and polarity detector produces a pulse on one of said two outputs for each rise transition of said rectangular waveform data signals and produces a pulse on the other of said outputs for each fall transition of said rectangular waveform data signals.

8. A receive coupler as claimed in claim 7, wherein said logic means includes:
first and second bistable devices; and,
control logic connected to said transition and polarity detector and to said first and second bistable devices for controlling the state of the outputs of said bistable devices such that the outputs of said bistable devices are in opposite complementary states.

9. A receive coupler as claimed in claim 8, wherein said control logic causes the output of said first and second bistable devices to switch states each time a pulse is produced by said transition and polarity detector.

10. A receive coupler as claimed in claim 9, wherein said transition and polarity detector includes:
- a first differentiator-comparator combination for differentiating transitions of said rectangular waveform data signals received by said transition and polarity detector from said coupling means and producing a pulse each time said first differentiator-comparator combination differentiates a rise transition that exceeds a predetermined threshold level; and,
- a second differentiator-comparator combination for differentiating transitions of said rectangular waveform data signals received by said transition and polarity detector from said coupling means and producing a pulse each time said second differentiator differentiates a fall transition that exceeds a predetermined threshold level.

* * * * *